March 8, 1960 S. C. SHAPPELL 2,927,680
CONVEYOR
Original Filed Oct. 31, 1955 3 Sheets-Sheet 1

INVENTOR
STANLEY C. SHAPPELL
BY *Joseph C. Ryan*
ATTORNEY

March 8, 1960 S. C. SHAPPELL 2,927,680
CONVEYOR

Original Filed Oct. 31, 1955 3 Sheets-Sheet 2

INVENTOR.
STANLEY C. SHAPPELL
BY Joseph C. Ryan
ATTORNEY

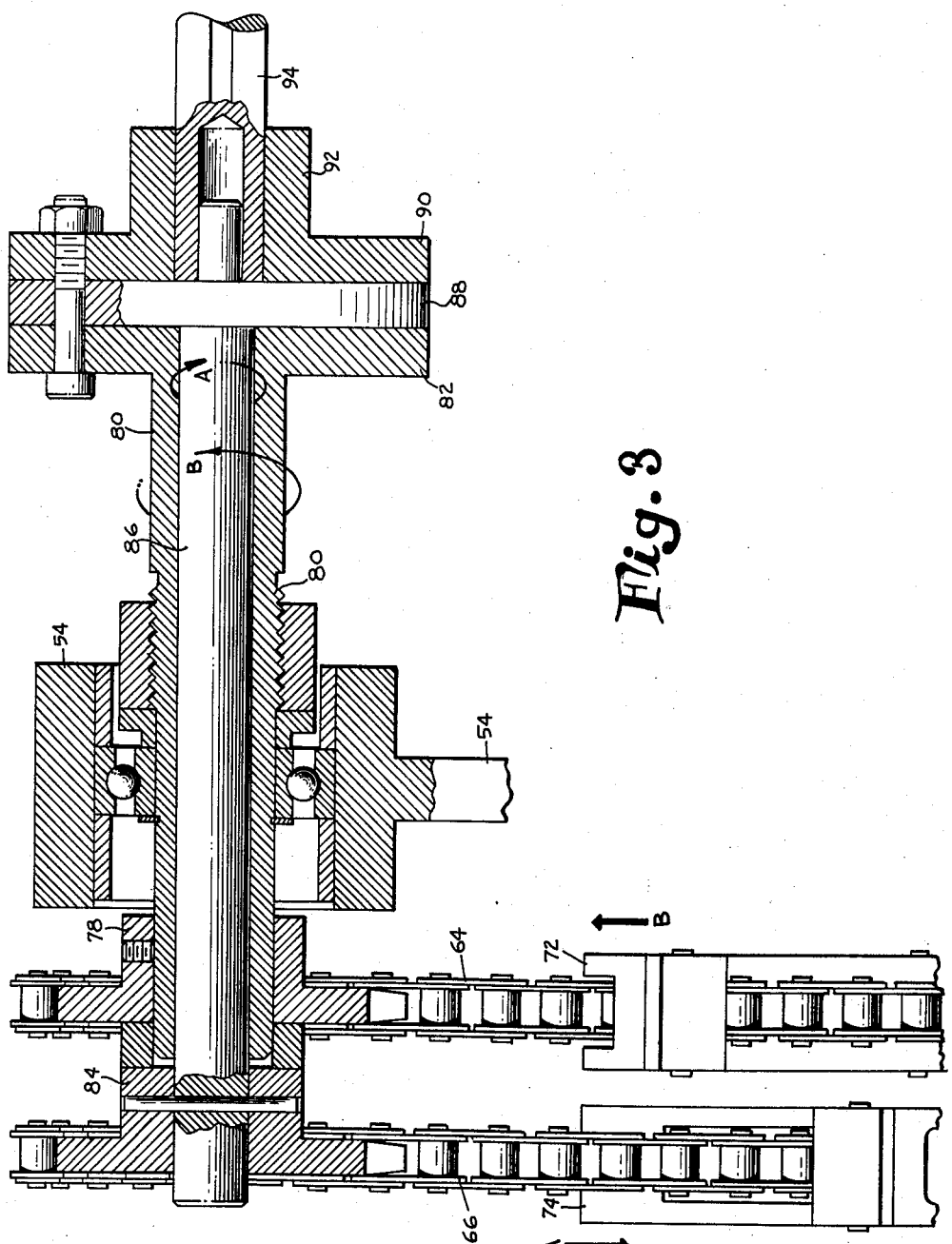

United States Patent Office 2,927,680
Patented Mar. 8, 1960

2,927,680

CONVEYOR

Stanley C. Shappell, West Boxford, Mass., assignor, by mesne assignments, to Sylvania Electric Products Inc., Wilmington, Del., a corporation of Delaware Original application October 31, 1955, Serial No. 543,673, now Patent No. 2,789,587, dated April 23, 1957. Divided and this application December 21, 1956, Serial No. 629,828

1 Claim. (Cl. 198—160)

This invention relates to article handling apparatus and more particularly to a conveyor for supporting elongated tubular articles during transfer from one place to another.

In the manufacture of fluorescent lamps, for example, the lamp tube is handled a number of times during lamp manufacturing operations. Sometimes this handling is done manually and on other occasions it is effected mechanically. With the development of high speed lamp manufacturing equipment, it has become more and more desirable to eliminate manual handling of the lamp tubes. With the development of equipment which is adjustable to enable processing of lamps of different sizes, it is desirable that the mechanical article handling device also be adjustable.

Accordingly, therefore, the principal object of this invention is to provide an article handling device characterized by means for quick adjustment to accommodate elongated tubular articles of different diameters.

In accordance with the principles of this invention, a conveyor, having a plurality of article-supporting devices disposed thereon, is provided with means for effecting relative displacement of the coacting jaws of the article-supporting devices while maintaining the same center line therebetween whereby elongated tubular articles of different diameters may be accommodated.

In the accompanying drawings, in which a specific embodiment of the invention is illustrated, Figure 1 is a side elevational view of the conveyor shown associated with a fragmentary portion of a lamp exhaust machine with which it may be employed.

Figure 3 is a fragmentary detail, partly in section, on an enlarged scale, of the means employed for effecting relative displacement of the coacting jaws of the article-supporting devices.

Figure 1:
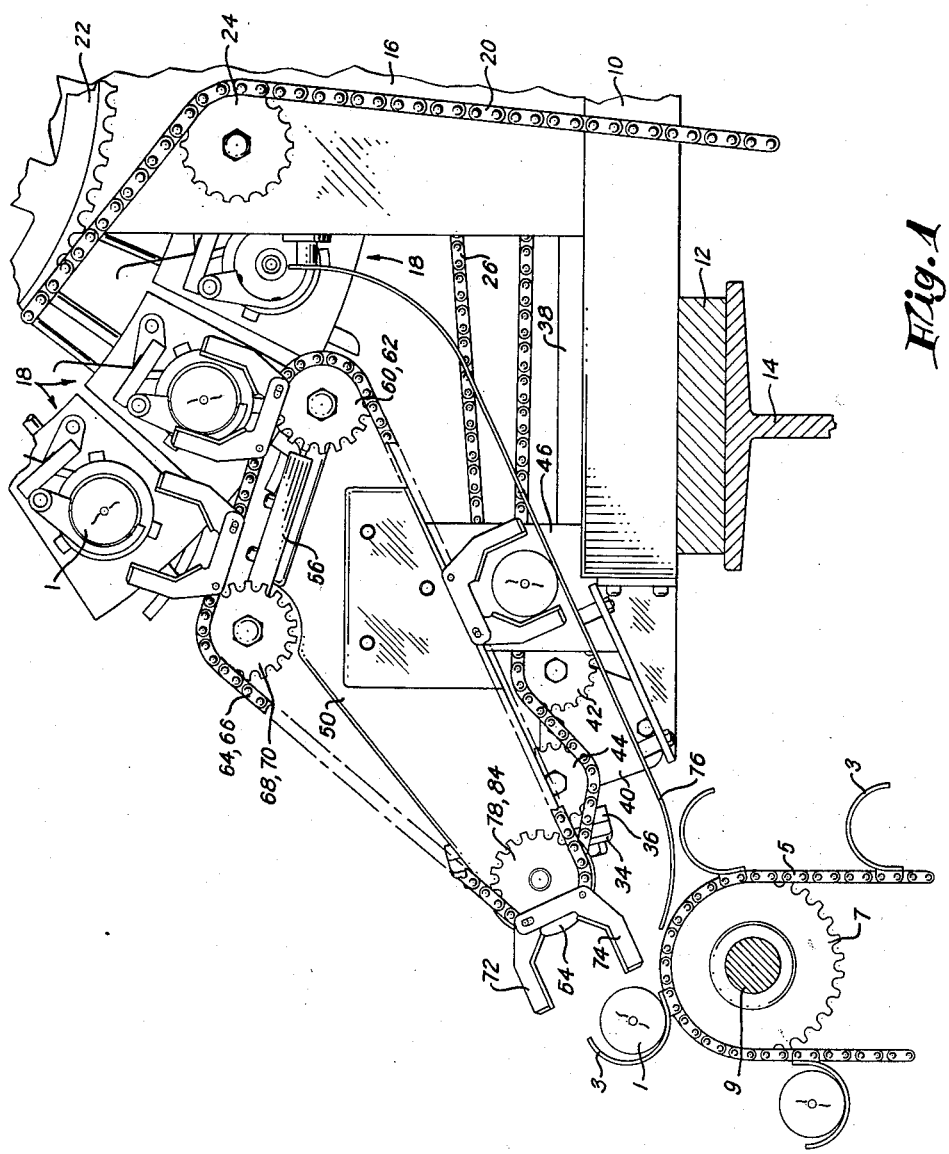

Since this application is a division of my co-pending application, Serial No. 543,673, filed October 31, 1955, entitled "Exhaust Machine," now U.S. Patent 2,789,587, the exhaust machine, a fragmentary portion of which is shown in Figure 1, is the exhaust machine shown and described in the parent application. The referenced exhaust machine comprises a plurality of heads, which support the lamp tubes and through which the lamp tubes are placed in communication with apparatus for performing the desired operations thereon. These heads are disposed on a pair of spaced carriers, the heads on one of said carriers being paired off in axial alignment with the heads on the other carrier. Each carrier includes a spider on which the heads are mounted, the spider being keyed to a shaft driven by suitable means to effect advancement of the heads through an operating cycle of 360 degrees.

That portion of the exhaust machine shown in Figure 1 comprises a carrier 10 supported on way 12 of base 14, the carrier 10 being provided with a pedestal 16 on which a bearing (not shown) is mounted for supporting a shaft (not shown). Heads 18, three of which are shown, are mounted on a spider (not shown) keyed to the aforementioned shaft which is driven by chain 20 and sprocket 22 which is keyed thereto, the sprocket 24 mounted on the face of pedestal 16 being a guide sprocket.

Figure 2:
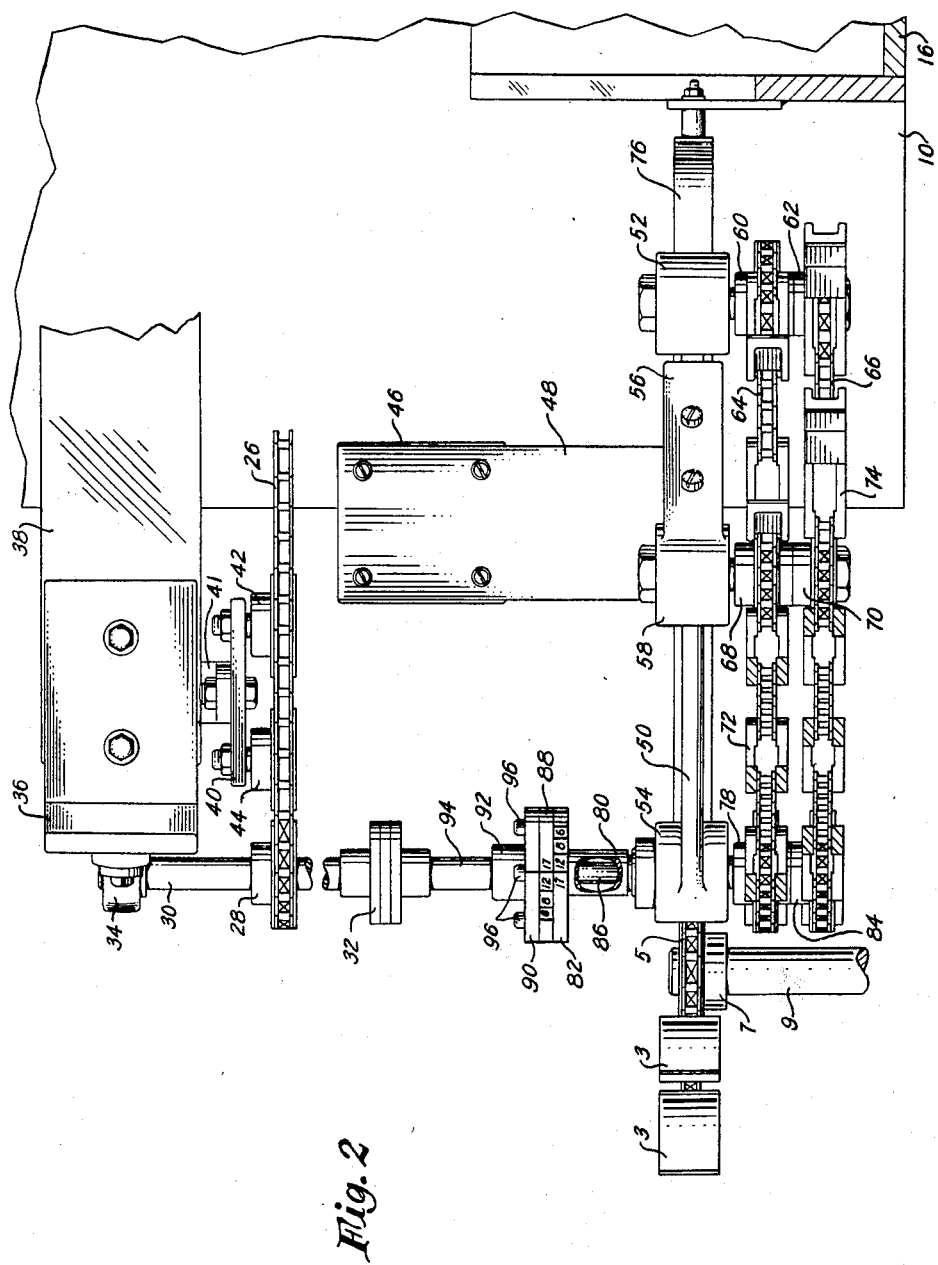
Figure 2 is a plan view of one side of the conveyor.

The conveyor will now be described, reference being made initially to Figure 2. Chain 26, a portion of which is shown, is driven by any suitable means, such as the main drive shaft of the exhaust machine of the parent application for example, and in timed relationship with respect to the movement of the heads 18 which carry lamp tubes 1. The chain 26 meshes with sprocket 28 on shaft 30. The shaft 30 is supported at one end thereof in coupling 32 and at the other end thereof in bearing housing 34. The bearing housing 34 is mounted on bracket 36 attached to plate 38 which is in turn attached to and extends outwardly from carrier 10. Bracket 40 supports sprockets 42 and 44 with which chain 26 meshes. The bracket 40 is mounted for angular adjustment on bracket 41 to permit tightening of chain 26. Bracket 41 is attached to the underside of plate 38.

The conveyor is mounted on a bracket 46 (Fig. 1) attached to and upstanding on carrier 10. A plate 48 (Fig. 2) attached to bracket 46 has a supporting plate 50 mounted on an end thereof. The supporting plate 50 is provided with bearing housings 52 and 54 at its extremities and an arm 56 mounted thereon intermediate its extremities, the arm 56 being provided with a bearing housing 58. Bearing housing 52 supports an axle on which sprockets 60 and 62 are mounted, chain 64 meshing with sprocket 60 and chain 66 meshing with sprocket 62. Bearing housing 58 supports an axle on which sprockets 68 and 70 are mounted, chain 64 meshing with sprockets 68 and chain 66 meshing with sprocket 70. The chains 64 and 66 are provided with a plurality of jaws 72 and 74 respectively. These jaws are related to one another to provide pairs of jaws which receive lamp tubes from the exhaust machine heads 18 (Fig. 1) and deposit them on track 76. From the track 76, the lamp tubes 1 are picked up by a suitable transfer mechanism or conveyor, a fragmentary portion of a device of this type being shown in Figure 1 and comprising a plurality of tube-supporting cradles 3 mounted in spaced relationship on a chain 5 driven by a sprocket 7 keyed to shaft 9.

The conveyor of my invention is adjustable to the extent that the relative location of each jaw in each pair of jaws 72—74 may be varied to receive lamp tubes of different diameters while maintaining the same center line therebetween. Referring now particularly to Figures 2 and 3, the chain 64 meshes with a sprocket 78 which is attached to one end of spindle 80, the other end of the spindle being provided with an index plate 82. The chain 66 meshes with a sprocket 84 which is attached to one end of spindle 86 which extends through and is concentric with spindle 80, the other end of the spindle 86 being provided with an index plate 88. A third index plate 90, is provided with a hub 92 and is keyed to shaft 94 which is connected to coupling 32. The index plates 82 and 88 are provided with similar graduations and the index plate 90 is provided with a reference line. These plates are normally fixedly attached to one another. When adjustment is to be effected, the bolts 96 are withdrawn from engagement with index plates 82 and 88, the plate 88 is rotated to bring the appropriate graduation thereon into register with the reference line on plate 90, the plate 82 is rotated to bring the appropriate graduation thereon into register with the reference line on plate 90, and the bolts 96 are returned to their locking position. Rotation of the index plates 82 and 88 effects movement of chains 64 and 66 respectively since they are connected to one another through their respective spindles and sprockets as described above. In this way, the jaws of each pair of jaws 72—74 are displaced with respect to one another to accommodate lamp tubes of various diameters.

What I claim is:

A conveyor for substantially tubular articles comprising: a pair of endless chains spaced from and in register with one another; a pair of sprockets, spaced from and in register with one another, each of said chains meshing with one of said sprockets; a spindle on which each of said sprockets is mounted, said spindles being concentric and one of said spindles lying within the other; a plurality of jaws mounted on each of said chains, each jaw on one of said chains being disposed in coacting relationship with each jaw on the other of said chains to define a pair of cooperating article-receiving jaws; means for driving said pair of chains in unison; and means, interposed between and connecting said driving means with said spindles, for effecting rotation of each of said spindles independently whereby the relative location of each jaw of each pair of jaws is changed to accommodate articles of different diameters, said means including a pair of calibrated disks, the graduations of which are brought into register during rotation of said spindles to insure maintenance of the same center line between the jaws of each pair of jaws.

References Cited in the file of this patent

UNITED STATES PATENTS

| | | |
|---|---|---|
| 1,815,372 | Frazier | July 21, 1931 |
| 1,843,453 | Littlefield | Feb. 2, 1932 |
| 2,557,866 | Eserkaln | June 19, 1951 |
| 2,736,421 | Bell | Feb. 28, 1956 |